United States Patent
Hubert et al.

(10) Patent No.: US 6,485,026 B1
(45) Date of Patent: Nov. 26, 2002

(54) NON-STAINLESS STEEL NITRIDED PISTON RING, AND METHOD OF MAKING THE SAME

(75) Inventors: Hélène Hubert, Saint Cloud (FR); Chantal Gral, Chatillon (FR)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/678,737

(22) Filed: Oct. 4, 2000

(51) Int. Cl.$^7$ .................. B60T 11/236; F02F 5/00; F16J 9/26
(52) U.S. Cl. ............. 277/434; 277/496; 277/940
(58) Field of Search ............ 277/434, 435, 277/436, 437, 438, 439, 447, 449, 456, 458, 466, 467, 496, 940

(56) References Cited

U.S. PATENT DOCUMENTS

| | | | |
|---|---|---|---|
| 3,864,221 A | 2/1975 | Ramqvist et al. | 204/38 |
| 3,874,066 A | 4/1975 | Lanner | 29/470.1 |
| 4,435,226 A | * 3/1984 | Neuhauser et al. | |
| 4,579,355 A | 4/1986 | Kooroki | 277/216 |
| 4,790,875 A | * 12/1988 | Urano et al. | |
| 4,966,751 A | 10/1990 | Kaede et al. | 420/34 |
| 4,985,092 A | 1/1991 | Kaede et al. | 148/326 |
| 5,104,132 A | 4/1992 | Onoda et al. | 277/235 A |
| 5,316,321 A | 5/1994 | Ishida et al. | 277/235 A |
| 5,403,547 A | * 4/1995 | Smith et al. | |
| 5,582,414 A | 12/1996 | Miyazaki et al. | 277/235 A |
| 5,605,741 A | 2/1997 | Hite et al. | 428/216 |
| 5,743,536 A | 4/1998 | Komuro et al. | 277/235 A |
| 5,773,734 A | * 6/1998 | Young | |
| 5,820,131 A | 10/1998 | Tanaka et al. | 277/442 |
| 5,916,517 A | 6/1999 | Hackl et al. | 420/38 |
| 6,209,881 B1 | * 4/2001 | Michel et al. | |

FOREIGN PATENT DOCUMENTS

| | | | |
|---|---|---|---|
| DE | 2139738 | * | 2/1973 |
| DE | 2444867 A | * | 4/1975 |
| DE | 2428821 A | * | 12/1975 |
| DE | 35 02 143 C3 | | 1/1985 |
| DE | 3431244 | | 3/1986 |
| DE | 3628157 A1 | * | 2/1998 |
| DE | 10012619 | | 9/2001 |
| EP | 0645 463 B1 | | 12/1997 |
| GB | 2314604 A | | 6/1997 |
| JP | 56095368 | | 6/1981 |
| JP | 58221428 | | 11/1983 |
| JP | 62116450 | | 5/1987 |
| JP | 06146888 | | 6/1994 |
| JP | 09196172 A | | 1/1996 |
| JP | 09210203 A | | 1/1996 |
| JP | 10053687 | | 3/1998 |
| JP | 10068042 A | * | 3/1998 |
| JP | 63140067 A | * | 6/1998 |
| JP | 10352759 | | 12/1998 |
| JP | 11336899 A | * | 12/1999 |

\* cited by examiner

*Primary Examiner*—Anthony Knight
*Assistant Examiner*—Vishal Patel
(74) *Attorney, Agent, or Firm*—Rader, Fishman & Grauer PLLC

(57) ABSTRACT

A piston ring is broadly defined as a ring-shaped, non-stainless steel, iron alloy that is nitrided, and includes between about 1% and about 10% chromium by weight, and preferably includes between about 1% and about 2% chromium by weight, with additional alloying elements also included.

2 Claims, 1 Drawing Sheet

NON-STAINLESS STEEL NITRIDED PISTON RING, AND METHOD OF MAKING THE SAME

FIELD OF THE INVENTION

The present invention relates to the field of piston rings. More particularly, the invention relates to the field of materials used to manufacture piston rings for automobiles.

BACKGROUND OF THE INVENTION

Piston rings that are used in the automobile industry are commonly nitrided by subjecting the piston rings to a PVD or CVD process, for example. A nitrogen-containing compound coats and/or penetrates the surface of the piston rings. Stainless steel has long been a preferred metal for piston rings as it is highly corrosive resistant and hard. Typically, stainless steel is about 81% iron, and about 18% chromium, with other alloying elements such as carbon, and nickel.

Because stainless steel is not typically highly alloyed, there are depassivation problems associated with a nitriding process, particularly involving a gas nitriding process. Efforts have been made to overcome depassivation problems such as raising the temperatures during nitriding, and prolonging the nitriding cycle. These steps are inefficient and therefore costly, with only limited success. Furthermore, stainless steel is rather difficult to prepare for machining of the piston rings. Coiling stainless steel wire requires a great amount of effort and time.

There is therefore a great need for a piston ring that is made from a strong, corrosion resistant metal that is easily and cheaply nitrided. There is also a need for a more efficient method for manufacturing piston rings.

SUMMARY OF THE INVENTION

The present invention relater to a piston ring that is broadly defined as a ring-shaped, non-stainless steel, iron alloy, sized and formed to accommodate an engine piston. The piston ring is nitrided, and the non-stainless steel enables a nitriding process to be performed in a relatively short interval, at lower temperatures than are required for stainless steel piston rings. The nitriding is most preferably performed using an ionic nitriding process.

The alloy includes between about 1% and about 10% chromium by weight, and preferably includes between about 1% and about 2% chromium by weight. By describing the alloy as a non-stainless steel, iron alloy, it is generally meant that the majority of the alloy is iron instead of, for example, titanium, and that chromium is present at a lower concentration than in stainless steel.

In a preferred embodiment of the invention, additional alloying elements are included. The alloy can further include carbon, manganese, and silicon, for example. Most preferably, chromium is included at no greater than 2% by weight, and carbon, manganese, and silicon are included at concentrations of no greater than about 1% by weight.

The alloy preferably includes even more alloying elements. One embodiment of the invention further includes phosphorus, sulfur, molybdenum, and vanadium, each being present at no greater than about 1% by weight. Another embodiment of the invention further includes aluminum and nickel, instead of phosphorus, sulfur, molybdenum, and vanadium. The aluminum and nickel are each included at no greater than about 1% by weight.

A particular embodiment of the invention includes a non-stainless steel, iron alloy that includes chromium at about 1.4% by weight, manganese at about 1% by weight, molybdenum at about 0.9% by weight, vanadium at about 0.2% by weight, carbon at about 0.2% by weight, silicon at about 0.1% by weight, phosphorus at about 0.02% by weight, and sulfur at about 0.004% by weight. Another particular embodiment of the invention includes a non-stainless steel, iron alloy that includes chromium at about 1.8% by weight, aluminum at about 1% by weight, nickel at about 1% by weight, manganese at about 0.7% by weight, carbon at about 0.3% by weight, and silicon at about 0.3% by weight.

Additional, advantages and novel features of the invention are set forth in the description that follows or may be learned by those skilled in the art through reading these materials or practicing the invention.

BRIEF DESCRIPTION OF THE DRAWINGS

The accompanying drawings illustrate the present invention and are a part of the specification.

Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
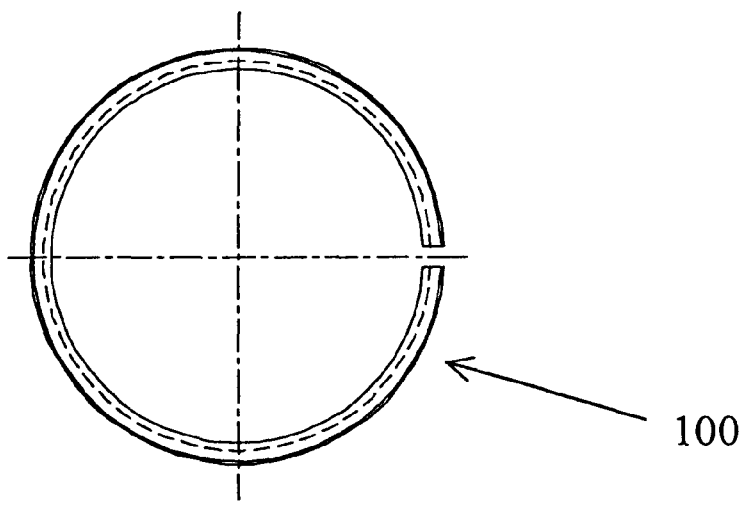
FIG. 1 is a top view of a piston ring according to the present invention.
Figures 2A, 2B:
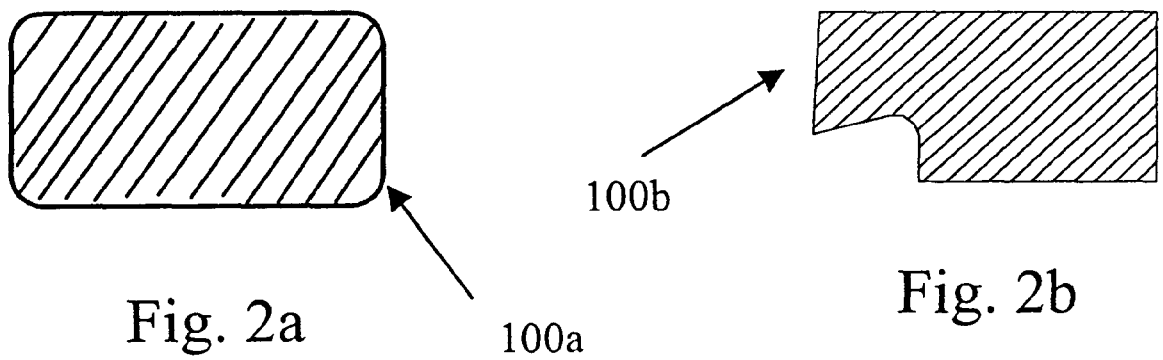
FIGS. 2a, 2b, and 2c are cross-sections of segments of exemplary piston rings according to the present invention.
Figure 2C:
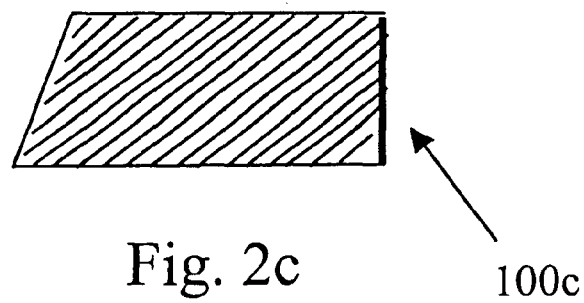

FIG. 1 shows the piston ring 100 of the present invention. The ring 100 can be sized for use with any type of internal combustion piston. A cross section of a segment of the ring 100 typically reveals that the ring 100 has a height that is approximately twice its thickness, although it is entirely conceivable that the ring 100 can be dimensioned in any necessary manner. Cross sections of segments of exemplary rings 100a, 100b, and 100c are shown in FIGS. 2a, 2b, and 2c.

The piston ring 100 of the present invention replaces the traditional use of stainless steel with nitriding steel. The term "nitriding steel" is meant to designate a steel alloy that is more adapted to a nitriding process, or has more nitriding potential, than stainless steel. More particularly, the nitriding steel used with the piston ring 100 of present invention is an alloy that has considerably less chromium content that is present in stainless steel. Stainless steel typically has a chromium content of about 15 to 20% by weight, most often about 18% by weight. The nitriding steel used with the piston ring 100 of the present invention can have much less than 10%, and as little as about 1% chromium. Most preferably, the chromium content is between about 1% and about 2% by weight. Other elements should also be included in the steel alloy such as carbon, manganese, and silicon. Also, phosphorus, sulfur, molybdenum, vanadium, aluminum, nickel, and other elements are examples of those that are commonly used in nitriding steel, and can be combined in the alloys that are employed for the piston ring 100 of the present invention. An ideal nitriding steel has relatively high hardness, but can still be deeply nitrided.

In one preferred embodiment of the invention, a nitriding steel alloy wire is used to manufacture a piston ring 100, and subjected to a nitriding treatment. The wire is made from a nitriding steel alloy, and the alloy is commercially available in either unshaped form or in wire form. The nitriding steel contains about 0.34% C, 1.75% Cr, 1% Al, 1% Ni, 0.7% Mn, 0.27% Si, with the balance being Fe. In Germany, the alloy is equivalent to 1.8550 steel. In France, the alloy is designated by AFNOR (French Norm Office) as ASCO 34CrAlNi7.

The nitriding steel wire is pressed into the shape of a piston ring 100 using common techniques. The corners of the ring 100 are preferably rounded as shown in FIG. 2. The ring 100 is then subjected to a nitriding process, preferably an ionic nitriding process, in a conventional chemical deposition chamber. With nitriding steel as the substrate, the gas nitriding process can be performed at lower temperatures, and in a shorter time cycle than when the substrate is stainless steel. The ease with which a deep nitriding of the piston ring 100 is performed is increased when the piston ring 100 is made of nitriding steel. This is because the problems of depassivation sometimes associated with stainless steel are not present with the nitriding steel that is part of the invention.

In another preferred embodiment of the invention, a different nitriding steel alloy wire is used to manufacture the piston ring 100. The wire is again made from a nitriding steel alloy, and the alloy is commercially available in either unshaped form or in wire form. If a suitable alloy is obtained in unshaped form, it is preferable that it be made into a wire or other form that will ease the shaping of the alloy into a piston ring. The nitriding steel in this preferred embodiment of the invention contains about 0.16% C, 1.37% Cr, 0.96% Mn, 0.09% Si, 0.020% P, 0.004% S, 0.934% Mo, and 0.231% V, with the balance being Fe. In France, the alloy is designated by AFNOR (French Norm Office) as ASCO 15CrMoV6. Once the piston ring 100 is formed, it is subjected to a nitriding treatment as described above.

The preceding description has been presented only to illustrate and describe the invention. It is not intended to be exhaustive or to limit the invention to any precise form disclosed. Many modifications and variations are possible in light of the above teaching.

The preferred embodiment was chosen and described to best explain the principles of the invention and its practical application. The preceding descriptions is intended to enable others skilled in the art to best utilize the invention in various embodiments and with various modifications as are suited to the particular use contemplated. It is intended that the scope of the invention be defined by the following claims.

What is claimed is:

1. A piston ring, which comprises:

a ring-shaped iron alloy that is nitrided, wherein said iron alloy comprises chromium at about 1.4% by weight, manganese at about 1% by weight, molybdenum at about 0.9% by weight, vanadium at about 0.2% by weight, carbon at about 0.2% by weight, silicon at about 0.1% by weight, phosphorus at about 0.02% by weight, and sulfur at about 0.004% by weight.

2. A method of manufacturing a piston ring, which comprises:

forming a nitrided ring of an iron alloy, wherein said iron alloy comprises chromium at about 1.4% by weight, manganese at about 1% by weight, molybdenum at about 0.9% by weight, vanadium at about 0.2% by weight, carbon at about 0.2% by weight, silicon at about 0.1% by weight, phosphorus at about 0.02% by weight, and sulfur at about 0.004% by weight.

* * * * *